United States Patent [19]

Oda et al.

[11] Patent Number: 4,839,214

[45] Date of Patent: Jun. 13, 1989

[54] CERAMIC ROTORS FOR PRESSURE WAVE SUPERCHARGERS AND PRODUCTION THEREOF

[75] Inventors: Isao Oda; Kiminari Kato, both of Nagoya, Japan

[73] Assignee: NGK Insulators, Ltd., Japan

[21] Appl. No.: 172,243

[22] Filed: Mar. 23, 1988

[30] Foreign Application Priority Data

Mar. 31, 1987 [JP] Japan .................................. 62-78229

[51] Int. Cl.[4] .................................................. B32B 3/12

[52] U.S. Cl. ....................................... 428/116; 156/89; 165/10; 264/177.12; 428/188

[58] Field of Search ........................ 428/116, 118, 188; 156/89; 165/10; 264/177.12

[56] References Cited

U.S. PATENT DOCUMENTS 4,304,585 12/1981 Oda et al. .......................... 264/60 X
4,336,304 6/1982 Landingham et al. ......... 428/698 X
4,357,987 11/1982 Oda et al. .............................. 165/10
4,489,774 12/1984 Ogawa et al. .................. 428/116 X
4,513,807 4/1985 Rose et al. ............................ 165/10
4,550,005 10/1985 Kato ............................... 264/177.12
4,556,543 12/1985 Mochida et al. ................ 428/116 X

*Primary Examiner*—Henry F. Epstein
*Attorney, Agent, or Firm*—Arnold, White & Durkee

[57] ABSTRACT

Ceramic rotors for pressure wave superchargers are disclosed, which have a honeycomb structure, wherein a material constituting partition walls of the honeycomb structure has an apparent density of 4.0 g/cm$^3$ or less, an open porosity of 3.0% or less, a coefficient of thermal expansion in a temperature range from room temperature to 800° C. being $5.5\times10^{-6}$/°C. or less, and a four point bending strength of 30 kg/mm$^2$ or more. A process for producing such ceramic rotors for pressure wave superchargers is also disclosed. The process includes the steps of preparing a ceramic body in which an average particle diameter of a ceramic raw material is controlled to 1 to 10 μm, extruding honeycomb structural bodies by press feeding the ceramic body through body feed holes and extruding channels having a width corresponding to a thickness of partition walls of the honeycomb structure in an extruding die, drying, firing and grinding the thus extruded bodies.

25 Claims, 3 Drawing Sheets

CERAMIC ROTORS FOR PRESSURE WAVE SUPERCHARGERS AND PRODUCTION THEREOF

BACKGROUND OF THE INVENTION (1) Field of the Invention

The present invention relates to ceramic rotors having a honeycomb structure for use in pressure wave superchargers and a process for producing the same.

More particularly, the invention relates to ceramic rotors suitably used for pressure wave superchargers in automobiles and production thereof (The ceramic honeycomb structures are used herein to mean a structure made of a ceramic material in which a plurality of through holes are defined by partition walls).

(2) Related Art Statement

Most pressure wave superchargers used in internal combustion engines in automobiles and the like have been rotors made of metallic materials. For instance, such rotors have been produced from an iron-cobalt-nickle alloy material according to a precision casting based on a lost wax process.

However, rotors for pressure wave superchargers require properties such as light weight, low thermal expansion, heat resistance, high strength, and low cost. It is difficult to attain all such properties when metallic materials are employed. Thus, a new process for producing rotors to be used in pressure wave superchargers by using new materials has been demanded.

Incidentally, rotors made of metallic materials for use in pressure wave superchargers intrinsically have a great apparent density of about 8 g/cc, so that the weight of the rotors is great. Thus, such rotors unfavorably need to be rotated by using belts because they cannot be rotated by an energy of waste gases from an engine. Further, their coefficient of thermal expansion is relatively large due to the metallic materials so that it is difficult to lessen a clearance at opposite axial ends of the rotor assembled into the supercharger between the rotor and a housing. Consequently, supercharging performance is undesirably damaged due to gas leakage. Further, since metallic rotors for use in pressure wave superchargers have a smaller strength per unit weight, it is difficult to make the thickness of cell walls smaller. Even if cells can be formed in two concentric annular rows, it is impossible that cells are formed in a concentrical arrangement consisting of three or more annular rows effective for reduction of noises because such an arrangement leads to weight increase.

Further, since metallic rotors for use in pressure wave superchargers have an upper tolerable limit for the maximum waste gas temperature, some limitation is necessary for a combustion temperature which effectively increases the efficiency of an engine output.

SUMMARY OF THE INVENTION

The present invention is to solve the above-mentioned problems encountered by the prior art, and to provide honeycomb structural ceramic rotors for use in pressure wave superchargers which exhibit light weight, small thermal expansion, high heat resistance, and high strength. The invention is also to provide a process for producing such honeycomb structural ceramic rotors.

That is, the ceramic honeycomb structural rotors according to the present invention are characterized in that a ceramic material constituting the ceramic rotors has an apparent density of 4.0 g/cm$^3$ or less, an open porosity of 3.0% or less, a coefficient of thermal expansion in a range from room temperature to 800° C. being $5.5\times10^{-6}$/°C. or less, and a four point bending strength of 30 kg/mm$^2$ or more.

The process for producing such ceramic honeycomb structural rotors comprises the steps of extruding honeycomb structural bodies by pressure feeding a ceramic raw material having an average particle diameter (hereinafter referred to briefly as "particle diameter") controlled in a range from 1 to 10 μm into a plurality of discharge slots having a width corresponding to the thickness of partition walls of the shaped bodies, through body feed holes of a shaping mold, drying, firing, and grinding the thus obtained honeycomb structural bodies.

These and other objects, features and advantages of the present invention will be appreciated upon reading the following description of the invention when taken in conjunction with the attached drawings, with the understanding that some modifications, variations, and changes could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

Figure 1:
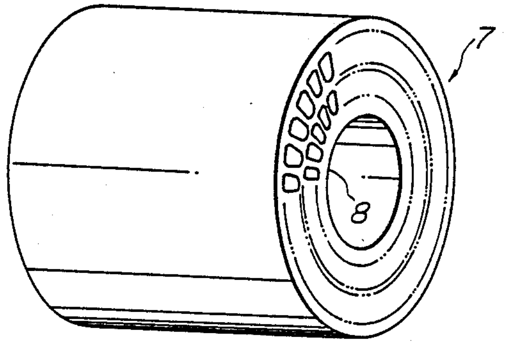
FIG. 1 is a perspective view illustrating the outline of an embodiment of the ceramic rotor for use in a pressure wave superchager according to the present invention.

In the present invention, it is important to prepare the proper kind of ceramic body. That is, it is necessary that the particle diameter of the ceramic raw material is in a range from 1 to 10 μm and a preferably in a range from 2 to 7 μm. If the particle diameter is less than 1 μm, shapability is poor and it is difficult to extrude honeycomb structural bodies. Further, cracks are likely to occur in honeycomb structural extruded bodies during drying. On the other hand, if it is more than 10 μm, desired strength cannot be obtained after firing.

As a ceramic body, add 4 to 10 parts by weight of a binder and 19 to 25 parts by weight of water to 100 parts by weight of a ceramic raw material. It is preferable to add 6 to 8 parts by weight of the binder and 20 to 23 parts by weight of water to 100 parts by weight of the ceramic raw material. If the amount of binder is less than 4 parts by weight, extruded bodies are likely to crack during drying or firing. On the other hand, if it is more than 10 parts by weight, viscosity of the ceramic body is too large thus rendering extrusion impossible. If the amount of water is less than 19 parts by weight, it is difficult to form a ceramic body due to insufficient plasticity. Furthermore, fine defects are likely to appear in partition walls of honeycomb structural bodies during extrusion, so that fine cracks grow during drying or firing to develop great cracks in the honeycomb structural bodies. Thus, desired rotors cannot be obtained. On the other hand, if the amount of water is more than 25 parts by weight, honeycomb structural bodies cannot uniformly be formed.

The particle diameter can be determined by analyzing a light diffraction phenomenon obtained through irradiating He-Ne laser beams upon a dispersed sample.

Further, four point bending strengths can be determined according to a testing method specified in JIS R1601.

A main starting ingredient of the ceramic body is not limited to any particular kind, but powdery $Si_3N_4$, SiC, or mullite is preferred. In addition, as a binder for the ceramic body, methyl cellulose and/or hydroxypropylmethyl cellulose is preferably used. Further, a water-soluble binder such as sodium alginate or polyvinyl alcohol may be blended to methyl cellulose and/or hydroxypropylmethyl cellulose. In order to uniformalize the ceramic body, it is preferable that a surface active agent such as a polycarbonic acid type polymer surface active agent or a non-ion type surface active agent is appropriately selectively blended. The thus obtained ceramic body is suitable for attaining light weight, low thermal expansion, and high strength which are required for ceramic rotors in pressure wave superchargers.

By using the ceramic body prepared above, ceramic rotors for pressure wave type superchargers according to the present invention having a specific structure and physical properties can subsequently be produced by extruding honeycomb structural bodies, drying, firing and grinding the thus extruded bodies.

The ceramic rotors for use in pressure wave type superchargers according to the present invention have a honeycomb structure, and a material constituting honeycomb structural partition walls has an apparent density of 4.0 g/cm$^3$ or less, preferably not more than 3.5 g/cm$^3$. If the apparent density of the material constituting the partition walls of the honeycomb structure exceeds 4.0 g/cm$^3$, produced rotors are so heavy that huge energy is necessary for rotating the rotors. Consequently, it becomes difficult to rotate the rotor with an energy possessed by waste gases. Further, strength per unit weight becomes smaller. Thus, an apparent density of over 4.0 g/cm$^3$ is unfavorable.

The open porosity of the material constituting the honeycomb partition walls needs to be 3.0% or less, preferably not more than 1.0%. If the open porosity of the material exceeds 3.0%, oxidation resistance of a rotor made of pressureless sintered silicon nitride or silicon carbide becomes extremely low so that the material is corroded through oxidation, deformed, or cracked.

The coefficient of thermal expansion of the material constituting the honeycomb partition walls in a range from room temperature to 800° C. needs to be $5.5\times10^{-6}$/°C. or less, preferably not more than $4.5\times10^{-6}$/°C. If the coefficient of thermal expansion is more than $5.5\times10^{-6}$/°C., a clearance between the rotor and a housing at axially opposite ends of the rotor becomes greater so that more gas is lost due to leakage. More than $5.5\times10^{-6}$/°C. is unfavorable.

Further, four point bending strength of the material constituting the honeycomb partition walls needs to be 30 kg/mm$^2$ more, preferably not less than 35 kg/mm$^2$. If the four point bending strength is less than 30 kg/mm$^2$, strength necessary for the pressure wave supercharger rotors cannot be attained.

Next, the process for producing the rotors for pressure wave superchargers according to the present invention will be explained with reference to FIGS. 1 to 6.

Figure 5:
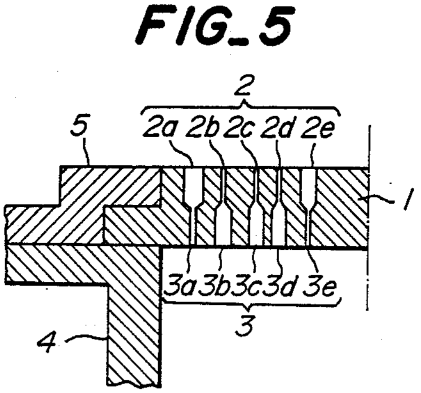
FIG. 5 is a sectional view of a part of a structure in which the die of FIG. 3 is attached to a cylinder of an extruding machine by using a die-fitting frame.

As mentioned above, the ceramic body having been controlled to possess specified physical properties is fed into a cylinder 4 of an extruding machine in FIG. 5, and led to feed holes 3 of a extruding die 1 under pressure. Since the ceramic body at feed holes 3*a* and 3*e* having a smaller hydraulic diameter undergoes greater resistance from an inner wall of the feed hole than that in feed holes 3*b*, 3*c* and 3*d* having a larger hydraulic diameter, a flowing speed of the ceramic body becomes smaller in the feed holes 3*a* and 3*e*. On the other hand, with respect to discharge slots 2, the extruding speed of the ceramic body through wider discharge slots 2*a* and 2*e* is greater than that in narrower discharge slots 2*b*, 2*c* and 2*d*. That is, the extruding speed of the ceramic body in the front face of the extruding die 1 is supplementally controlled by dimensions of the discharge slots 2 and the feeding holes 3 so that thicker and thinner partition walls may be extruded at the same extruding speed. Thus, a honeycomb structural body 6 as shown in FIG. 2 is obtained.

Figure 6:
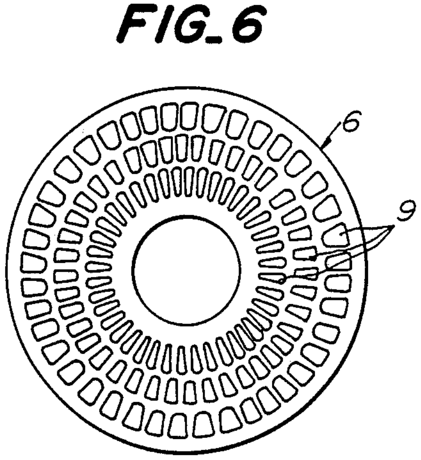
FIG. 6 is a plane view of a ceramic rotor extruded in another embodiment according to the present invention.

By using the same method as mentioned above, a honeycomb structural body 6 having three concentrically arranged annular rows of through holes as shown in FIG. 6 and those having four or more concentrically arranged annular rows of through holes can be obtained.

Figure 2:
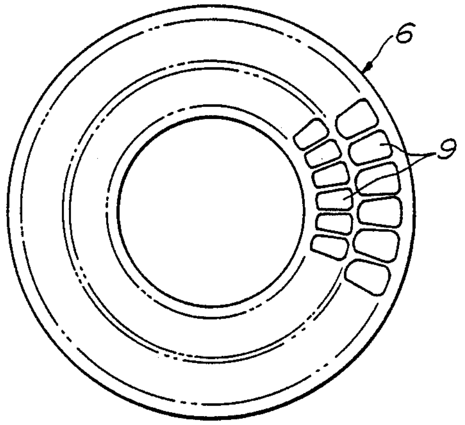
FIG. 2 is a front view of a ceramic honeycomb structural body extruded and dried according to the method of the present invention.
Figure 3:
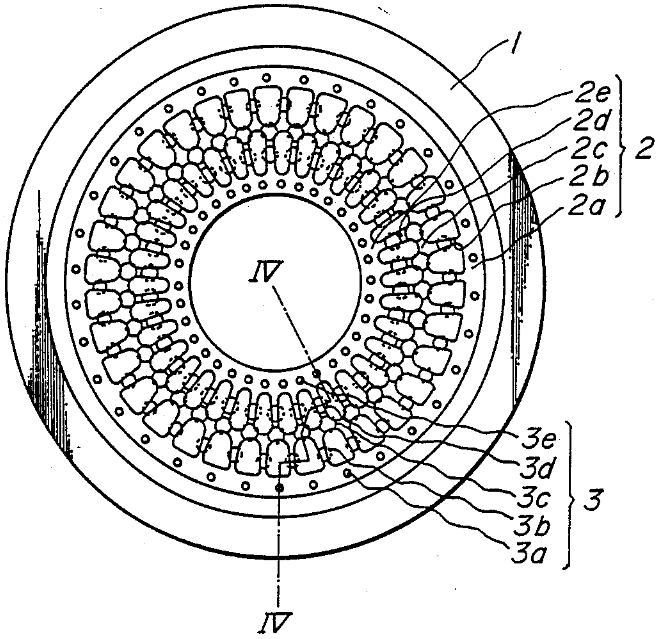
FIG. 3 is a front view of an extruding die for extruding ceramic honeycomb structural bodies according to the present invention as viewed from an extruding side.
Figure 4:
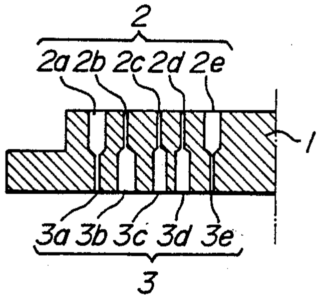
FIG. 4 is a sectional view of FIG. 3 along a line IV—IV.

In FIGS. 1, 2 and 6, through holes 9 are concentrically arranged.

Next, the thus obtained honeycomb structural body 6 is dried by heating in a dielectrical drier or with hot air, calcined, for instance, at a temperature of about 600° C. in an inert gas atmosphere to remove a binder, and then fired at a temperature from 1,700° to 1,800° C. for 1 to 4 hours in a nitrogen atmosphere in the case of pressureless sintering of silicon nitride. In the case of pressureless sintering of silicon carbide, firing is effected at a temperature from 1,950° to 2,200° C. for 1 to 2 hours in an Ar gas atmosphere. A rotor 7 for a pressure wave supercharger according to the present invention can be obtained by grinding the fired structural body.

After the honeycomb structural body 6 is dried, it may be covered with a non-permeable film such as a latex, and then hydrostatically pressed at a pressure of 1,000 kg/cm$^2$ or more to increase the strength thereof.

In the following, the present invention will be explained in more detail with reference to specific examples.

EXAMPLE 1

A powdery ceramic raw material was prepared by mixing 4 parts by weight of powdery magnesium oxide, 5 parts by weight of powdery cerium oxide and 1.0 part by weight of powdery strontium carbonate as a sintering aid into 90 parts by weight of powdery silicon nitride having the particle diameter of 5.0 μm. To 100 parts by weight of the powdery ceramic raw material were mixed and kneaded 6 parts by weight of a binder mainly consisting of methyl cellulose as an extruding aid, 23 parts by weight of water, and 1 part by weight of a polycarbonic acid type polymer surface active agent, and the mixture was treated by an auger type extruder under vacuum to remove air contained therein, thereby preparing a ceramic body to be extruded. The thus obtained ceramic body was inserted into a cylinder 4 of an extruding machine, and was shaped through a given extruding die 1 at a pressure of 100 kg/cm$^2$. Then, the thus obtained honeycomb structural body 6 was dehumidified at a water-removing percentage of 30% by dielectrical drying, and the remaining water was removed off with hot air at 70° C. It was visually observed that a desired shape shown in FIG. 2 was formed free from defects such as cracks.

Then, the dried honeycomb structural body was calcined at 600° C. in a nitrogen gas atmosphere to remove the binder, and fired at 1,700° C. in a nitrogen gas atmosphere for 2 hours. After the firing, a ceramic rotor 7 for a pressure wave supercharger according to the present invention in a shape of 35 mm in inner diameter, 105 mm in outer diameter, and 105 mm in length with an apparent density of 3.20 g/cm$^2$ was obtained by grinding the fired shaped body. It was visually observed that the obtained rotor was free from defects such as cracks.

Next, a test piece of 3 mm$\times$4 mm$\times$40 mm was taken out from a hub 8 of the rotor, and its physical properties were evaluated. Four point bending strengths at room temperature and 800° C. were 45 kg/mm$^2$ and 40 kg/mm$^2$, respectively. The coefficient of thermal expansion in a temperature range from room temperature to 800° C. was $3.7\times10^{-6}$/°C. The open porosity was 0.1% A ceramic rotor of the same lot as that of the above test piece was heated at 800° C. for 1,000 hours in air, and the oxidation resistance thereof was examined. The rotor was free from deformation or cracking, although its color was slightly changed.

Next, a ceramic rotor of the same lot was assembled into a pressure wave supercharger, and its rotation performance was examined. As a result, it was revealted that the rotor was rotated by an energy of an exhaust gas without necessitating belt driving. Thus, its performance was superior to that of metallic rotors.

EXAMPLES 2~5 AND COMPARATIVE EXAMPLES 1~3

After a ceramic body shown in Table 1 was prepared by the same method as in Example 1, honeycomb structural bodies 6 was extruded by using an extrusion die 1, followed by drying. The dried honeycomb structural bodies were visually checked to examine whether a desired shape shown in FIG. 2 was formed or not and whether cracks occurred or not. With respect to the honeycomb structural bodies having passed through this visual inspection, a binder was removed off in the same manner as in Example 1, and they were fired under conditions shown in FIG. 1 and further ground, thereby obtaining rotors for pressure wave superchargers. The rotors had an inner diameter of 35 mm, an outer diameter of 105 mm, and a length of 102 mm. After grinding the ceramic rotors, crack occurrence was visually checked. Test pieces of 3 mm$\times$4 mm$\times$40 mm were taken out from each of the rotors having passed through this visual check, and their properties were measured. As a result, the rotors according to the present invention (Examples 2~5) met desired properties and could be used as ceramic rotors, while those outside the present invention (Comparative Example 1) had low strength and could not be used as a rotor.

Rotors belonging to the same lot as those having passed through the visual inspection were subjected to an oxidation resistance test at 800° C. in air. It was recognized that the rotors outside the present invention were corroded through oxidation.

Each of ceramic rotors of the same lot as those obtained according to the present invention was assembled into a pressure wave supercharger, and their performance was tested. As a result, it was revealed that each of them was rotated by an energy of an exhaust gas without necessitating belt driving, and thus displayed superior performance to metallic rotors.

From the above, it was found that only the ceramic rotors according to the present invention were suitable for ceramic rotors for pressure wave type superchargers.

TABLE 1

| | | | Example | | | |
|---|---|---|---|---|---|---|
| No. | | | 2 | 3 | 4 | 5 |
| Ceramic body | main ingredient | kind | $Si_3N_4$ | $Si_3N_4$ | $Si_3N_4$ | SiC |
| | | particle diameter (μm) | 1.5 | 9.0 | 2.5 | 3.0 |
| | | mixed amount (parts by weight) | 0 | 86 | 88 | 96 |
| | sintering aid | kind | $SrCO_3$ MgO $CeO_2$ | $SrCO_3$ MgO $CeO_2$ | $Y_2O_3$ MgO $CeO_2$ | $B_4C$ C |
| | | mixed amount (parts by weight) | 1.5 3.5 5 | 1.4 5.9 6.7 | 6.0 4.0 2.0 | 1.5 2.5 |
| | binder (parts by weight) | | 8 | 5 | 9 | 6 |
| | water (parts by weight) | | 21 | 19 | 23 | 22 |
| | surface active agent (parts by weight) | | 2 | 1 | 0.5 | 0.5 |
| Firing conditions | firing temperature (°C.) | | 1700 | 1780 | 1700 | 2100 |
| | firing time (Hr) | | 2 | 2 | 2 | 1 |
| | firing atmosphere | | $N_2$ | $N_2$ | $N_2$ | Ar |
| Physical properties of ceramic rotor | coefficient of thermal expansion (1/°C.) (room temperature~800° C.) | | $3.7\times10^{-6}$ | $3.9\times10^{-6}$ | $3.7\times10^{-6}$ | $4.3\times10^{-6}$ |
| | four point bending strength at room temperature (kg/mm$^2$) | | 47 | 44 | 45 | 39 |
| | four point bending strength at 800° C. (kg/mm$^2$) | | 41 | 40 | 35 | 39 |
| | open porosity (%) | | 0.1 | 2.5 | 0.5 | 1.5 |
| | apparent density (g/cm$^3$) | | 3.21 | 2.90 | 3.15 | 2.93 |
| | visual inspection result* | | O | O | O | O |

TABLE 1-continued

| | | | | |
|---|---|---|---|---|
| 800° C. × 1000 Hr oxidation resistance test | good | good | good | good |
| Total evaluation | O | O | O | O |

| | | | Comparative Example | | | | | | | |
|---|---|---|---|---|---|---|---|---|---|---|
| | No. | | | 1 | | | 2 | | 3 | |
| Ceramic body | main ingredient | kind | | $Si_3N_4$ | | | $Si_3N_4$ | | $SiC$ | |
| | | particle diameter (μm) | | 12.0 | | | 0.8 | | 3.0 | |
| | | mixed amount (parts by weight) | | 85 | | | 90 | | 96 | |
| | sintering aid | kind | $SrCO_3$ | MgO | $CeO_2$ | $SrCO_3$ | MgO | $CeO_2$ | $B_4C$ | C |
| | | mixed amount (parts by weight) | 2.4 | 5.9 | 6.7 | 1.5 | 3.5 | 5.0 | 1.5 | 2.5 |
| | binder (parts by weight) | | | 7 | | | 3 | | 5 | |
| | water (parts by weight) | | | 22 | | | 20 | | 18 | |
| | surface active agent (parts by weight) | | | 1 | | | 1 | | 1 | |
| Firing conditions | firing temperature (°C.) | | | 1700 | | | — | | 2100 | |
| | firing time (Hr) | | | 2 | | | — | | 1 | |
| | firing atmosphere | | | $N_2$ | | | — | | Ar | |
| Physical properties of ceramic rotor | coefficient of thermal expansion (l/°C.) (room temperature ~ 800° C.) | | | $3.7 \times 10^{-6}$ | | | — | | — | |
| | four point bending strength at room temperature ($kg/mm^2$) | | | 28 | | | — | | — | |
| | four point bending strength at 800° C. ($kg/mm^2$) | | | 25 | | | — | | — | |
| | open porosity (%) | | | 4.5 | | | — | | — | |
| | apparent density ($g/cm^3$) | | | 2.72 | | | — | | — | |
| | visual inspection result* | | | O | | | X | | Δ | |
| | 800° C. × 1000 Hr oxidation resistance test | | | deformed and cracked by oxidation | | | — | | — | |
| | Total evaluation | | | X | | | X | | X | |

*O: passed after drying and grinding
Δ: passed after drying but rejected after grinding due to cracking
X: rejected after drying due to cracking As described above in detail, the ceramic rotors for pressure wave supercharges according to he present invention meet all performances such as a low coefficient of thermal expansion, high heat resistance, light weight, high strength and low cost because they are produced by extruding process which is suitable for mass production. Thus, the invention can provide higher performance rotors as compared with conventional metallic rotors, and the ceramic rotors can widely be used in pressure wave superchargers in diesel engines and gasoline engines. Thus, the present invention is extremely profitable in the industrial sphere.

What is claimed is:

1. A ceramic rotor for a pressure wave supercharger, comprising a honeycomb structure having a plurality of partition walls therein defining a plurality of longitudinal through holes radially arranged around a rotating axis of said rotor, wherein said partition walls have an apparent density of not greater than 4.0 $g/m^3$, an open porosity of not greater than 3.0%, a coefficient of thermal expansion in a temperature range of about 25° C. to about 800° C. of not greater than $5.5 \times 10^{-6}$/°C., and a four point bending strength of not less than 30 $kg/mm^2$.

2. A ceramic rotor for a pressure wave supercharger according to claim 1, wherein said apparent density is not greater than 3.5 $g/cm^3$.

3. A ceramic rotor for a pressure wave supercharger according to claim 1, wherein said open porosity is not greater than 1.0%.

4. A ceramic rotor for a pressure wave supercharger according to claim 1, wherein said coefficient of thermal expansion is not greater than $4.5 \times 10^{-6}$/°C.

5. A ceramic rotor for a pressure wave supercharger according to claim 1, wherein said four point bending strength is not less than 35 $kg/mm^2$.

6. A ceramic rotor for a pressure wave supercharger according to claim 1, wherein said honeycomb structure is composed of pressureless sintered silicon nitride.

7. A ceramic rotor for a pressure wave supercharger according to claim 1, wherein said honeycomb structure is composed of pressureless sintered silicon carbide.

8. A ceramic rotor for a pressure wave supercharger according to claim 1, wherein said longitudinal through holes are arranged in said honeycomb structure in three or more concentric annular rows.

9. A process for producing ceramic rotors for pressure wave superchargers, comprising the steps of:

preparing a ceramic batch material from ceramic raw materials having particles with an average particle diameter of 1–10 μm;

extruding honeycomb structural bodies by press feeding the ceramic batch material through feed holes and discharge slots of an extrusion die, said discharge slots having a width corresponding to a thickness of partition walls of said honeycomb structures which define a plurality of through holes radially arranged therein around a rotating axis thereof;

drying the extruded honeycomb structural bodies;

firing the dried bodies; and grinding the fired bodies to achieve a predetermined dimension.

10. A process according to claim 9, wherein a main ingredient of said ceramic batch material is powdery silicon nitride.

11. A process according to claim 9, wherein a main ingredient of said ceramic batch material is powdery silicon carbide.

12. A process for producing ceramic rotors for pressure wave superchargers comprising the steps of:

preparing a ceramic batch material including 4–10 parts by weight binder, 19–25 parts by weight water, and 100 parts by weight ceramic raw material, said ceramic raw material having particles with an average particle size of 1–10 μm;

extruding honeycomb structural bodies by press feeding the ceramic batch material through feed holes and discharge slots of an extrusion die, said discharge slots having a width corresponding to a thickness of partition walls of said honeycomb structures which define a plurality of through holes raidally arranged therein around a rotating axis thereof;

drying the extruded honeycomb structural bodies;

firing the dried bodies at a temperature of about 1700°–2200° C. for 1–4 hours; and grinding the fired bodies to achieve a predetermined dimension.

13. A process according to claim 12, wherein said average particle size is in the range of 2–7 μm.

14. A process according to claim 12, wherein said binder is present in an amount of 6–8 parts by weight and said water is present in an amount of 20–33 parts by weight.

15. A process according to claim 12, further comprising a calcination step at about 600° C. in an inert atmosphere, said calcination step being performed before said firing step.

16. A process according to claim 12, further comprising a hydrostatic pressing step at a pressure of at least 1000 $kg/cm^2$, said hydrostatic pressing step being performed after said drying step and before said firing step.

17. A process according to claim 12, wherein said binder comprises at least one binder material selected from the group consisting of methyl cellulose, hydroxypropylmethyl cellulose, sodium alginate, and polyvinyl alcohol.

18. A process according to claim 12, wherein said ceramic batch material further comprises a surface active agent selected from the group consisting of polycarbonic acid polymer agents and non-ionic agents.

19. A process according to claim 12, wherein said ceramic raw material comprises powdery silicon nitride.

20. A process according to claim 19, wherein said ceramic raw material further comprises at least one sintering aid selected from the group consisting of $SrCo_3$, MgO, $CeO_2$ and $Y_2O_3$.

21. A process according to claim 19, wherein said dried bodies are fired at a temperature of about 1700°–1800° C. for about 4 hours in an $N_2$ atmosphere.

22. A process according to claim 12, wherein said ceramic raw material comprises powdery silicon carbide.

23. A process according to claim 22, wherein said ceramic raw material further comprises at least one sintering aid selected from the group consistig of $B_4C$ and C.

24. A process according to claim 22, wherein said dried bodies are fired at a temperature of about 1950°–2200° C. for about 1–2 hours in an Ar atmosphere.

25. A process according to claim 12, wherein said ceramic raw material comprises powdery mullite.

* * * * *

UNITED STATES PATENT AND TRADEMARK OFFICE
CERTIFICATE OF CORRECTION

PATENT NO. : 4,839,214

DATED : June 13, 1989

INVENTOR(S) : Isao ODA et al.

It is certified that error appears in the above-identified patent and that said Letters Patent is hereby corrected as shown below:

Column 1, line 33, change "8 g/cc," to --8g/$cm^3$--.

Column 4, line 40, delete "1,".

Columns 5-6, Table 1, line 5, change "0" to --90--.

Signed and Sealed this

Seventeenth Day of July, 1990

*Attest:*

HARRY F. MANBECK, JR.

*Attesting Officer* — *Commissioner of Patents and Trademarks*